US012418447B2

(12) United States Patent
Lopez et al.

(10) Patent No.: US 12,418,447 B2
(45) Date of Patent: Sep. 16, 2025

(54) PACKET FORMAT FOR TRANSMISSION OF DATA PACKETS

(71) Applicant: Telefonaktiebolaget LM Ericsson (publ), Stockholm (SE)

(72) Inventors: Miguel Lopez, Solna (SE); Sebastian Max, Cologne (DE); Leif Wilhelmsson, Lund (SE); Dennis Sundman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 663 days.

(21) Appl. No.: 17/641,301

(22) PCT Filed: Sep. 16, 2020

(86) PCT No.: PCT/EP2020/075865
§ 371 (c)(1),
(2) Date: Mar. 8, 2022

(87) PCT Pub. No.: WO2021/053016
PCT Pub. Date: Mar. 25, 2021

(65) Prior Publication Data
US 2022/0286338 A1   Sep. 8, 2022

Related U.S. Application Data

(60) Provisional application No. 62/901,556, filed on Sep. 17, 2019.

(51) Int. Cl.
*H04L 27/26* (2006.01)
*H04L 5/00* (2006.01)
*H04W 72/044* (2023.01)

(52) U.S. Cl.
CPC ........ *H04L 27/2613* (2013.01); *H04L 5/0007* (2013.01); *H04L 27/2666* (2013.01); *H04W 72/044* (2013.01)

(58) Field of Classification Search
CPC .............. H04L 27/2613; H04L 5/0007; H04L 27/2666; H04L 27/2607; H04L 27/26132; H04W 72/044
(Continued)

(56) References Cited

U.S. PATENT DOCUMENTS 9,648,620 B2 *  5/2017  Tandra ............. H04W 72/0453
9,655,145 B2     5/2017  Son et al.
(Continued)

FOREIGN PATENT DOCUMENTS

CN    103621033 A    3/2014
CN    103986682 A    8/2014
(Continued)

OTHER PUBLICATIONS

International Search Report dated Dec. 9, 2020 for International Application No. PCT/EP2020/075865 filed Sep. 16, 2020, consisting of 12 pages.
(Continued)

*Primary Examiner* — Rownak Islam
(74) *Attorney, Agent, or Firm* — Weisberg I.P. Law, P.A.

(57) ABSTRACT

A packet format is disclosed for transmission of data packets over a communication channel, wherein transmission of one of the data packets utilizes a frequency bandwidth, and wherein the frequency bandwidth is dynamically variable between data packets. The packet format defines a frequency bandwidth detection field, wherein the frequency bandwidth detection field of a data packet has a first field content or a second field content, and wherein corresponding parts of the first and second field contents are orthogonal to each other. The first field content is indicative of that transmission of the data packet utilizes a first frequency bandwidth and the second field content is indicative of that transmission of the data packet utilizes a frequency bandwidth which is larger
(Continued)

than the first frequency bandwidth. Corresponding methods and apparatuses for transmission/reception of data packets are also disclosed.

24 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0128806 A1* | 5/2013 | Vermani | ................. | H04L 69/22 370/328 |
| 2017/0105213 A1 | 4/2017 | Seok | | |
| 2017/0279582 A1* | 9/2017 | Lee | ................... | H04L 27/26136 |

FOREIGN PATENT DOCUMENTS

| | | |
|---|---|---|
| CN | 105262566 A | 1/2016 |
| CN | 107736072 A | 2/2018 |
| WO | 2017048438 A1 | 3/2017 |

OTHER PUBLICATIONS

Yu, et al. "Preamble Structure" IEEE 802.11-19/1099r0; Jul. 2019, consisting of 12 pages.
Hart et al. "6GHz Principles"; IEEE 802.11-18/1897r0; Nov. 2018, consisting of 13 pages.
Hart et al. "Recommended Direction for EHT"; IEEE 802.11-18/1549r0; Sep. 2018, consisting of 19 pages.
Chinese Office Action and English summary dated Mar. 30, 2024 for Application No. 202080065037.6, consisting of 7 pages.
Chinese Notice of Allowance dated Feb. 20, 2025 and machine English translation of the Chinese Office Action issued in corresponding Chinese Application No. 202080065037.6, consisting of 10 pages.

* cited by examiner

PACKET FORMAT FOR TRANSMISSION OF DATA PACKETS

CROSS-REFERENCE TO RELATED APPLICATIONS

This application is a Submission Under 35 U.S.C. § 371 for U.S. National Stage Patent Application of International Application No.: PCT/EP2020/075865, filed Sep. 16, 2020 entitled "PACKET FORMAT FOR TRANSMISSION OF DATA PACKETS," which claims priority to U.S. Provisional Application No. 62/901,556, filed Sep. 17, 2019, entitled "PACKET FORMAT FOR TRANSMISSION OF DATA PACKETS," the entireties of both of which are incorporated herein by reference.

TECHNICAL FIELD

The present disclosure relates generally to the field of wireless communication. More particularly, it relates to packet formats for transmission of data packets.

BACKGROUND

In wireless communication, any overhead signaling reduces the upper limit on data throughput. Therefore, there is a need for approaches to wireless communication that are effective in terms of overhead signaling.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a packet format for transmission of data packets over a communication channel, wherein transmission of one of the data packets utilizes a frequency bandwidth, and wherein the frequency bandwidth is dynamically variable between data packets.

The packet format defines a frequency bandwidth detection field, wherein the frequency bandwidth detection field of a data packet has a first field content or a second field content, and wherein corresponding parts of the first and second field contents are orthogonal to each other.

The first field content is indicative of that transmission of the data packet utilizes a first frequency bandwidth and the second field content is indicative of that transmission of the data packet utilizes a frequency bandwidth which is larger than the first frequency bandwidth.

In some embodiments, transmission of each of the data packets utilizes a frequency bandwidth, wherein the frequency bandwidth is dynamically variable between data packets.

In some embodiments, the first field content comprises at least one instance of a first orthogonal frequency division multiplex (OFDM) symbol, and the second field content comprises at least one instance of a second OFDM symbol, wherein the second OFDM symbol is a time reversed version of the first OFDM symbol.

In some embodiments, the first field content consists of two instances of the first OFDM symbol and a first cyclic prefix (CP), wherein the first CP is a copy of a portion of the first OFDM symbol, and the second field content consists of two instances of the second OFDM symbol and a second CP, wherein the second CP is a copy of a portion of the second OFDM symbol.

In some embodiments, corresponding parts are defined as instances of the first and second OFDM symbols.

In some embodiments, the frequency bandwidth is dynamically variable between at least two predetermined frequency bandwidths: the first frequency bandwidth and one or more second frequency bandwidths.

In some embodiments, the packet format further defines one or more of: a synchronization field comprising a repetitive time domain pattern, a control field utilizing the first frequency bandwidth when the frequency bandwidth detection field has the first field content and utilizing a second frequency bandwidth when the frequency bandwidth detection field has the second field content, and a data field suitable for transmission over the frequency bandwidth indicated by the frequency bandwidth detection field.

In some embodiments, the control field is indicative of which of the one or more second frequency bandwidths is utilized for transmission of the data packet.

In some embodiments, the synchronization field is a legacy short training field (L-STF).

In some embodiments, the control field is a signaling field or signal field (SIG).

In some embodiments, the data packet is a physical layer convergence protocol data unit (PPDU).

In some embodiments, the frequency bandwidth detection field is a legacy long training field (L-LTF).

In some embodiments, the packet format is for use in compliance with IEEE802.11ax and/or IEEE802.11be.

A second aspect is a method for transmission of data packets over a communication channel, wherein the data packets have a packet format, wherein transmission of one of the data packets utilizes a frequency bandwidth, and wherein the frequency bandwidth is dynamically variable between data packets.

The method comprises populating a frequency bandwidth detection field of the packet format with a first field content or a second field content, wherein corresponding parts of the first and second field contents are orthogonal to each other, and wherein the first field content is selected when transmission of the data packet utilizes a first frequency bandwidth and the second field content is selected when transmission of the data packet utilizes a frequency bandwidth which is larger than the first frequency bandwidth.

A third aspect is a method for reception of data packets over a communication channel, wherein the data packets have a packet format, wherein transmission of one of the data packets utilizes a frequency bandwidth, and wherein the frequency bandwidth is dynamically variable between data packets.

The method comprises detecting whether a frequency bandwidth detection field of the packet format has a first field content or a second field content, wherein corresponding parts of the first and second field contents are orthogonal to each other, processing the data packet as received over a first frequency bandwidth when the first field content is detected, and processing the data packet as received over frequency bandwidth which is larger than the first frequency bandwidth when the second field content is detected.

A fourth aspect is a computer program product comprising a non-transitory computer readable medium, having thereon a computer program comprising program instructions. The computer program is loadable into a data processing unit and configured to cause execution of the method according to the second and/or third aspect when the computer program is run by the data processing unit.

A fifth aspect is an apparatus for transmission of data packets over a communication channel, wherein the data packets have a packet format, wherein transmission of one of the data packets utilizes a frequency bandwidth, and wherein the frequency bandwidth is dynamically variable between data packets.

The apparatus comprises controlling circuitry configured to cause population of a frequency bandwidth detection field of the packet format with a first field content or a second field content, wherein corresponding parts of the first and second field contents are orthogonal to each other, and wherein the first field content is for indicating transmission of the data packet utilizing a first frequency bandwidth and the second field content is for indicating transmission of the data packet utilizing a frequency bandwidth which is larger than the first frequency bandwidth.

A sixth aspect is an apparatus for reception of data packets over a communication channel, wherein the data packets have a packet format, wherein transmission of one of the data packets utilizes a frequency bandwidth, and wherein the frequency bandwidth is dynamically variable between data packets.

The apparatus comprises controlling circuitry configured to cause detection of whether a frequency bandwidth detection field of the packet format has a first field content or a second field content, wherein corresponding parts of the first and second field contents are orthogonal to each other, processing of the data packet as received over a first frequency bandwidth when the first field content is detected, and processing of the data packet as received over frequency bandwidth which is larger than the first frequency bandwidth when the second field content is detected.

In some embodiments, the packet format of any of the second through sixth aspects is the packet format of the first aspect.

A seventh aspect is a transmitter comprising the apparatus of the fifth aspect.

An eighth aspect is a receiver comprising the apparatus of the sixth aspect.

A ninth aspect is a wireless communication device comprising one or more of: the apparatus of the fifth aspect, the apparatus of the sixth aspect, the transmitter of the seventh aspect, and the receiver of the eighth aspect.

In some embodiments, the wireless communication device is an access point or a station.

In some embodiments, any of the above aspects may additionally have features identical with or corresponding to any of the various features as explained above for any of the other aspects.

An advantage of some embodiments is that effective overhead signaling is provided.

Another advantage of some embodiments is that, for systems employing a frequency bandwidth which is dynamically variable between data packets, information regarding which frequency bandwidth is utilized for transmission of a data packet may be conveyed without any increase in overhead signaling. This is applicable, for example, when frequency bandwidth detection field already conveys other signaling (e.g., control signaling), and the information regarding which frequency bandwidth is utilized for transmission of a data packet is indicated by whether or not part(s) of the frequency bandwidth detection field is time reversed.

In some embodiments, the packet format is a Physical Layer Convergence Protocol Data Unit (PPDU) format with even lower overhead than the low throughput physical layer (LT PHY) presented in "Recommended Direction for EHT", Cisco Systems, doc.: IEEE 802.11-18/1549r0, 2018-09-09.

In some embodiments, the PPDU is compatible with IEEE802.11ax STAs (e.g., operating in the 6 GHz frequency band spectrum); which is not the case for the LT PHY.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
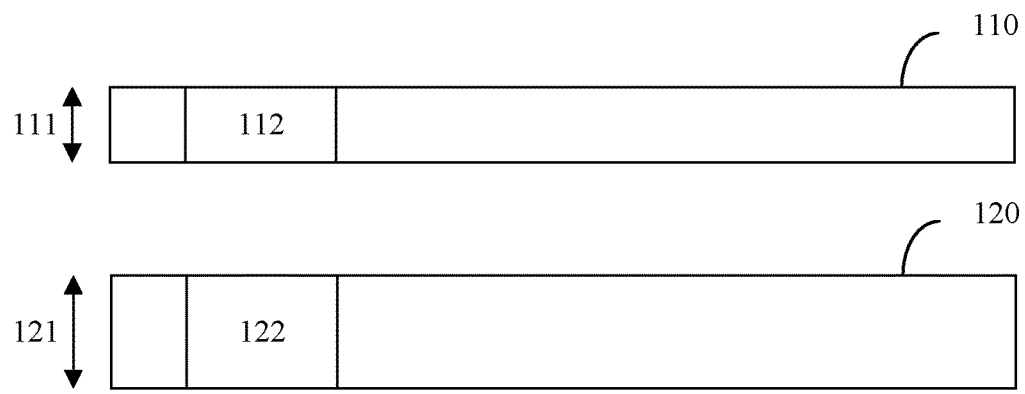
FIG. 1 is a schematic drawing illustrating example packet formats according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a packet format for transmission of data packets over a communication channel is provided. The packet format is configured to convey information regarding a frequency bandwidth utilized for transmission of the data packet.

It should be understood that, generally, the use of terms like "data" and "data packet" may refer to any type of data (e.g., control data, management data, configuration data, payload data, etc.).

Use of the packet format will be exemplified in the context of wireless local area network (WLAN) IEEE802.11 standards. It should be noted, however, that this is intended as a non-limiting example and that embodiments may be equally applicable in other contexts where conveying of information regarding a frequency bandwidth utilized for transmission of the data packet is beneficial. The context of IEEE802.11 standards will now be briefly described.

The 6 GHz frequency band spectrum is expected to be available for unlicensed operation soon. IEEE802.11ax is the first variant of WLAN designed to operate in this frequency band. Furthermore, the IEEE802.11be Task Group (TGbe) has been formed to develop Extremely High Throughput (EHT), which is meant to supersede IEEE802.11ax. One of the objectives of TGbe is to standardize a physical layer (PHY) for operation in the 6 GHz frequency band.

The current practice in IEEE802.11n/ac/ax WLAN operating in the 5 GHz frequency band spectrum is to transmit control information, management information, and short data frames using a Physical Layer Convergence Protocol Data Unit (PPDU) format compatible with IEEE802.11a, since such an approach provides backwards compatibility with legacy IEEE 802.11 devices.

The IEEE802.11a PHY supports only 20 MHz frequency bandwidth and the PPDU format consists of a preamble of 20 μs duration (consisting of a legacy short training field (L-STF) of 8 μs duration, a legacy long training field (L-LTF) of 8 μs duration, and a signaling field (SIG) of 4 μs duration) and a data field. The L-LTF consists of a repetition of a 3.2 μs orthogonal frequency division multiplex (OFDM) symbol, prepended by a 1.6 μs cyclic prefix (CP) which consists of a copy of the last part of the OFDM symbol.

More recent PHY (e.g., IEEE802.11ac/ax) typically have more overhead—and consequently more functionality. The IEEE802.11ac/ax PPDU has a variable bandwidth (20, 40, 80, or 160 MHz), and the bandwidth is indicated in a 20 MHz field which precedes the part of the PPDU which utilizes the full bandwidth of 20, 40, 80, or 160 MHz.

An IEEE802.11ac PPDU for 80 MHz frequency bandwidth consists of legacy short training field (L-STF) of 8 μs duration, legacy long training field (L-LTF) of 8 μs duration, legacy signaling field (L-SIG) of 4 μs duration, very high throughput signaling field A (VHT-SIG-A) of 8 μs duration, very high throughput short training field (VHT-STF) of 4 μs duration, very high throughput long training field (VHT-LTF) of 4 μs duration, very high throughput signaling field B (VHT-SIG-B) of 4 μs duration, and a very high throughput (VHT) data field. L-STF, L-LTF, L-SIG, and VHT-SIG-A each has 20 MHz bandwidth and is transmitted in four identical copies over the 80 MHz frequency bandwidth. VHT-SIG-A comprises an indication of the bandwidth used for the subsequent fields (VHT-STF, VHT-LTF, VHT-SIG-B and VHT data). VHT-STF, VHT-LTF, VHT-SIG-B and the VHT data field each has 80 MHz bandwidth.

An IEEE802.11ax PPDU for 80 MHz frequency bandwidth consists of legacy short training field (L-STF) of 8 μs duration, legacy long training field (L-LTF) of 8 μs duration, legacy signaling field (L-SIG) of 4 μs duration, repeated legacy signaling field (RL-SIG) of 4 μs duration, high efficiency signaling field A (HE-SIG-A) of 8 μs duration, high efficiency short training field (HE-STF) of 4 μs duration, high efficiency long training field (HE-LTF) of variable duration, and a high efficiency (HE) data field. L-STF, L-LTF, L-SIG, RL-SIG, and HE-SIG-A each has 20 MHz bandwidth and is transmitted in four identical copies over the 80 MHz frequency bandwidth. HE-SIG-A comprises an indication of the bandwidth used for the subsequent fields (HE-STF, HE-LTF, and HE data). HE-STF, HE-LTF, and the HE data field each has 80 MHz bandwidth.

If devices (STA) support adaptive channel bandwidth, using IEEE802-11a/ac/ax PHY in a data transfer session aiming for 80 MHz frequency bandwidth (consisting of a 20 MHz primary bandwidth, a 20 MHz secondary bandwidth, and a 40 MHz secondary bandwidth) may comprise a first device (STA1) sending four copies of a 20 MHz Ready To Send (RTS) message over the 80 MHz bandwidth using IEEE802.11a PHY. If the 40 MHz secondary bandwidth experiences interference (e.g., from a hidden node), a second device (STA2) may respond by sending two copies of a 20 MHz Clear To Send (CTS) message over the 20 MHz primary bandwidth and the 20 MHz secondary bandwidth using IEEE802.11a PHY. Then, STA1 may transmit data over 40 MHz (the 20 MHz primary bandwidth and the 20 MHz secondary bandwidth) using IEEE802.11ac PHY, and STA2 may respond by sending two copies of a 20 MHz Block Acknowledgement (BA) message over the 20 MHz primary bandwidth and the 20 MHz secondary bandwidth using IEEE802.11a PHY.

If devices (STA) do not support adaptive channel bandwidth, using IEEE802-11a/ac/ax PHY in a data transfer session aiming for 80 MHz frequency bandwidth (consisting of a 20 MHz primary bandwidth, a 20 MHz secondary bandwidth, and a 40 MHz secondary bandwidth) may comprise a first device (STA1) sending four copies of a 20 MHz Ready To Send (RTS) message over the 80 MHz bandwidth using IEEE802.11a PHY. If, for example, the 40 MHz secondary bandwidth experiences interference (e.g., from a hidden node), a second device (STA2) cannot respond by sending a Clear To Send (CTS) message and no transmission can be started by STA1. If no interference is experienced, STA2 can respond by sending four copies of a 20 MHz Clear To Send (CTS) message over the full 80 MHz bandwidth using IEEE802.11a PHY. Then, STA1 may transmit data over the 80 MHz bandwidth using IEEE802.11ac PHY, and STA2 may respond by sending four copies of a 20 MHz Block Acknowledgement (BA) message over the 80 MHz bandwidth using IEEE802.11a PHY.

There will typically not be any legacy devices operating in the 6 GHz frequency band spectrum. Therefore, full backward capability is typically not necessary and it may be desirable to avoid use of inefficient and/or inadequate legacy PHY for this frequency band. Stations (STA) supporting IEEE802.11be and IEEE802.11ax will typically co-exist in the 6 GHz frequency band.

It has been proposed to introduce a Low Throughput (LT) PHY for operation in the 6 GHz frequency band spectrum (see, e.g., "Recommended Direction for EHT", Cisco Systems, doc.: IEEE 802.11-18/1549r0, 2018 Sep. 9, and "6 GHz Principles", Cisco Systems, doc.: IEEE 802.11-18/1897r0, 2018 Nov. 2). Such a PHY could, for example, be used to transmit short frames (e.g., comprising control, management, and/or data) and could have a similar function as that of IEEE802.11a PHY in the 5 GHz frequency band; but being better suited for extremely high throughput (EHT). It should be noted that the LT PHY suggested in the above referenced documents is not compatible with IEEE802.11ax. Thus, an IEEE802.11ax STA potentially operating in the 6 GHz frequency band will not be able to decode a PPDU transmitted using LT PHY.

As noted above, low overhead is typically important to achieve high throughput. A lean PHY (PPDU format) for EHT in accordance with some embodiments presented herein may have an important function for WLAN operating in the 6 GHz frequency band, since it is typically more efficient than the existing alternatives for short frames. Also, a lean PHY (PPDU format) for EHT in accordance with some embodiments presented herein may be compatible with IEEE802.11ax.

FIG. 1 schematically illustrates an example packet format according to some embodiments. The packet format is for transmission of data packets 110, 120 over a communication channel, wherein transmission of a data packet utilizes a frequency bandwidth 111, 121.

The frequency bandwidth is dynamically variable between data packets, which is illustrated by the respective bandwidths 111, 121 of data packets 110, 120 being different. Typically, the frequency bandwidth is dynamically variable between at least two predetermined frequency bandwidths: the first frequency bandwidth (e.g., 20 MHz) and one or more second frequency bandwidths (e.g., 20, 40, 80, or 160 MHz).

A data packet may, according to some embodiments, be seen as a physical layer data unit comprising a data field and a preamble. The data field may sometimes be referred to as a "data packet", but when the term "data packet" is used herein, it typically refers to the physical layer data unit comprising a data field and a preamble. A data packet may, for example, be a PPDU for IEEE802.11.

The data packet format defines (or comprises) a frequency bandwidth detection field which is illustrated by 112, 122 in FIG. 1. Typically, the frequency bandwidth detection field is part of the preamble.

As exemplified above, the fields of the preamble (or some of the fields of the preamble) may extend over a frequency bandwidth (e.g., 20 MHz) which may be lower than the frequency bandwidth of the data field (e.g., 20, 40, 80, or 160 MHz). Then, fields of the preamble may be transmitted in several instances according to some embodiments, to cover the frequency bandwidth of the data field. This may, in some embodiments, apply to the frequency bandwidth detection field, as suitable.

The frequency bandwidth detection field 112, 122 of a data packet 110, 120 has a first field content or a second field content, wherein corresponding parts of the first and second field contents are orthogonal to each other.

Orthogonality may be defined in any suitable way. Typically, it may refer to a correlation between corresponding parts of the first and second field content being zero. The correlation may, for example, be a correlation between symbol samples (e.g., time domain samples for an OFDM symbol).

The first field content is indicative of that transmission of the data packet utilizes a first frequency bandwidth (e.g., 111) and the second field content is indicative of that transmission of the data packet utilizes a frequency bandwidth (e.g., 121) which is larger than the first frequency bandwidth.

Thereby, the frequency bandwidth detection field 112, 122 conveys information regarding the frequency bandwidth utilized for transmission of the data packet.

The second field content may be a time reversed version of the first field content in some embodiments. Alternatively, the second field content consists of two or more parts, wherein at least one part is a time reversed version of the corresponding part of the first field content in some embodiments.

When the frequency bandwidth detection field already conveys other signaling, the information regarding the frequency bandwidth utilized for the data packet may be very efficiently conveyed by means of time reversal as described above.

In some embodiments, the first field content may comprise at least one instance of a first OFDM symbol, and the second field content may comprise at least one instance of a second OFDM symbol, wherein the second OFDM symbol is a time reversed version of the first OFDM symbol.

For example, the first field content may consist of two instances of the first OFDM symbol and a first cyclic prefix (CP; a copy of a portion—typically the last portion—of the first OFDM symbol), and the second field content may consist of two instances of the second OFDM symbol and a second CP (a copy of a portion—typically the last portion—of the second OFDM symbol). The corresponding parts of the first and second field contents may be defined as corresponding instances of the first and second OFDM symbols.

Figure 2:
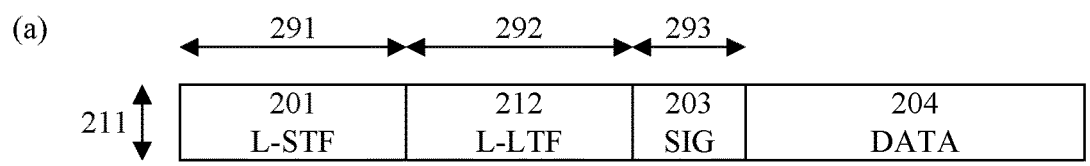
FIG. 2 is a schematic drawing illustrating example packet formats according to some embodiments.
Figure 2:
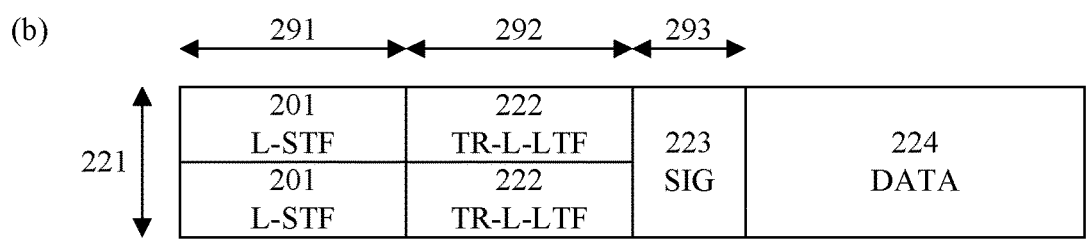
Figure 2:
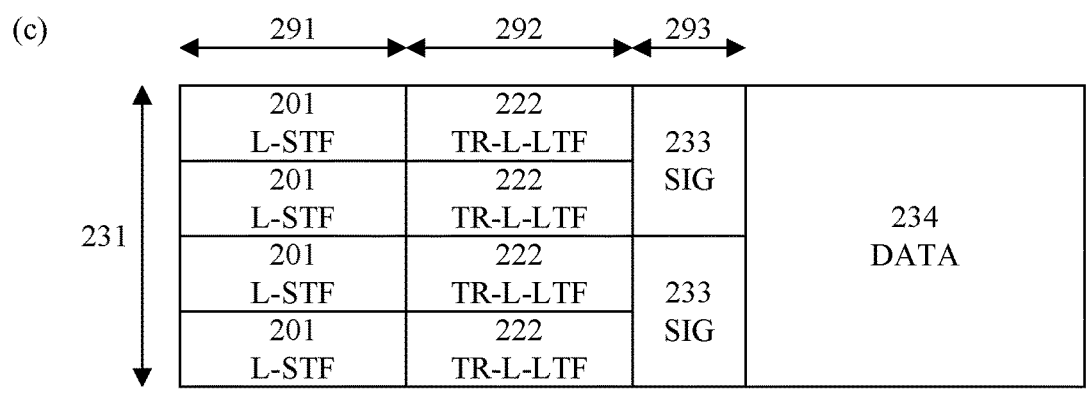
Figure 3:
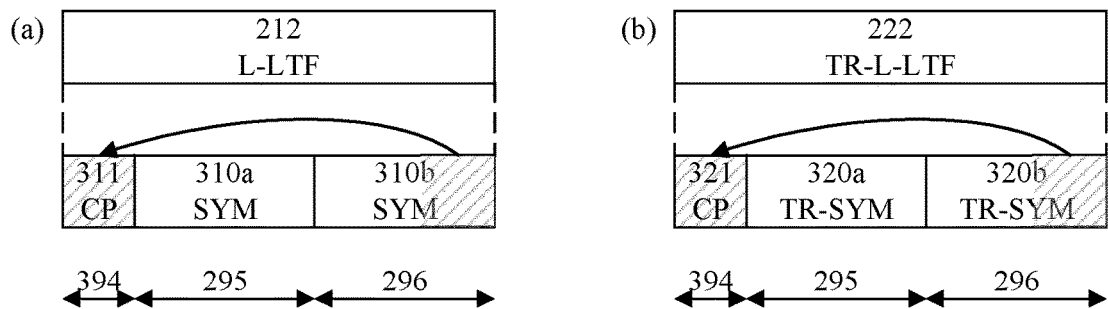
FIG. 3 is a schematic drawing illustrating example frequency bandwidth detection fields according to some embodiments.
Figure 4:
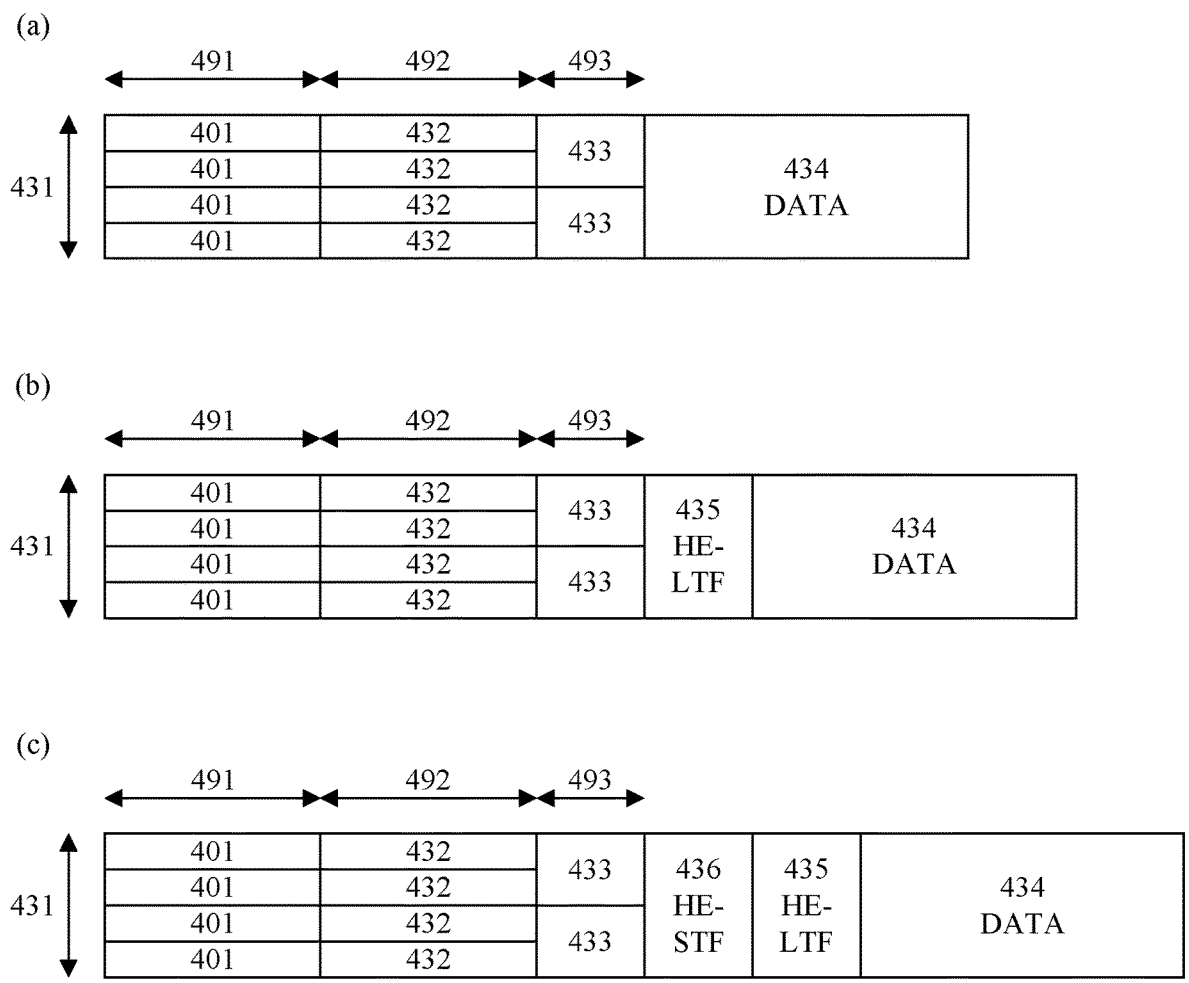
FIG. 4 is a schematic drawing illustrating example packet formats according to some embodiments.

FIGS. 2-4 relate to examples wherein the packet format is for use in compliance with IEEE802.11ax and/or IEEE802.11be.

FIG. 2 schematically illustrates an example packet format of a PPDU for IEEE802.11 according to some embodiments. The packet format is for transmission of data packets over a communication channel, wherein transmission of a data packet utilizes a frequency bandwidth.

The frequency bandwidth is dynamically variable between data packets. Typically, the frequency bandwidth is dynamically variable between at least two predetermined frequency bandwidths: the first frequency bandwidth (e.g., 20 MHz) and one or more second frequency bandwidths (e.g., 20, 40, 80, or 160 MHz). A data packet utilizing a frequency bandwidth 211 (e.g., 20 MHz) is illustrated at (a), a data packet utilizing a frequency bandwidth 221 (e.g., 40 MHz) is illustrated at (b), and a data packet utilizing a frequency bandwidth 231 (e.g., 80 MHz) is illustrated at (c).

Referring to the packet format (a), the PPDU format consists of a preamble of 20 μs duration (consisting of L-STF 201 of 8 µs duration 291, L-LTF 212 of 8 µs duration 292, and SIG 203 of 4 µs duration 293) and a data field 204, just as for IEEE802.11a. All fields extend over 20 MHz as illustrated by 211.

Referring to the packet format (b), the PPDU format consists of a preamble of 20 µs duration (consisting of L-STF 201 of 8 µs duration 291, TR-L-LTF 222 of 8 µs duration 292, and SIG 223 of 4 µs duration 293) and a data field 224. L-STF and TR-L-LTF extend over 20 MHz and are each transmitted in two instances, and SIG and the data field extend over 40 MHz as illustrated by 221.

Referring to the packet format (c), the PPDU format consists of a preamble of 20 µs duration (consisting of L-STF 201 of 8 µs duration 291, TR-L-LTF 222 of 8 µs duration 292, and SIG 233 of 4 µs duration 293) and a data field 234. L-STF and TR-L-LTF extend over 20 MHz and are each transmitted in four instances, SIG extend over 40 MHz and is transmitted in two instances and the data field extend over 80 MHz as illustrated by 231.

According to some embodiments, pilot tones may be included in SIG to enable use of 802.11ac numerology and/or channel coding for the data.

L-LTF/TR-L-LTF may be used as frequency bandwidth detection field.

As illustrated in FIG. 3(a), the L-LTF 212 consists of (i.e., the first field content is) a repetition of an OFDM symbol (SYM) 310a, 310b having a 3.2 µs duration 295, 296; prepended by a cyclic prefix (CP) 311 having a 1.6 µs duration 394 which consists of a copy of the last part of the OFDM symbol 310b as illustrated by the striped part of 310b.

As illustrated in FIG. 3(b), the TR-L-LTF 222 consists of (i.e., the second field content is) a repetition of a time reversed version 320a, 320b of the OFDM symbol 310a, 310b of FIG. 3(a) (TR-SYM) having a 3.2 µs duration 295, 296; prepended by a cyclic prefix (CP) 321 having a 1.6 µs duration 394 which consists of a copy of the last part of the time reversed version of the OFDM symbol 320b as illustrated by the striped part of 320b.

Thus, the second field content TR-L-LTF consists of three parts 321, 320a, 320b, wherein at two parts 320a, 320b are time reversed versions of the corresponding parts 310a, 310b of the first field content L-LTF.

It will now be demonstrated that the OFDM symbol and its time reversed version (corresponding parts of the first and second field contents) are orthogonal to each other.

The L-LTF is designed to have low peak to average power ratio (PAPR), to enable fine frequency correction and to allow channel estimation. It may be defined by the sequence of frequency domain symbols: $\{LTF_k\}_{k=-26}^{26} = \{1,1,-1,-1, 1,1,-1,1,-1,1,1,1,1,1,1,-1,-1,1,1,1,-1,1,-1,1,1,1,1,1,0,1,-1,-1, 1,1,-1,1,-1,1,-1,-1,-1,-1,-1,1,1,-1,-1,1,-1,1,-1,1,1,1,1\}$. This sequence is used to construct an OFDM symbol x(t) having a T=3.2 µs duration by means of a Fourier transform: $x(t)=\sum_{k=-26}^{26} LTF_k e^{j2\pi kt/T}$, $0 \leq t \leq T=3.2$ µs.

Time reversal of the OFDM symbol x(t) may be defined by the operation $t \rightarrow (T-t)$. When this operation is applied to x(t), the time reversed OFDM symbol $x_{TR}(t)$ is obtained: $x_{TR}(t)=\sum_{k=-26}^{26} LTF_k e^{j2\pi k(T-t)/T}$, $0 \leq t \leq T=3.2$ µs.

Changing the summation index, it follows that $x_{TR}(t) = \sum_{m=-26}^{26} LTF_{-m} e^{j2\pi mt/T}$, i.e., that the time reversed symbol $x_{TR}(t)$ can be obtained by reversing the order of the frequency domain symbols $\{LTF_k\}_{k=-26}^{26}$ prior to application of the Fourier transform.

By direct computation it can be verified that the LTF sequence is orthogonal to the reversed LTF sequence: $\sum_{k=-26}^{26} LTF_k \, LTF_{-k}=0$. Since the Fourier transform preserves orthogonality, the digital versions of the OFDM symbol x(t) and its time reversal $x_{TR}(t)$ are also orthogonal:

$$\sum_{n=0}^{63} x\left(\frac{nT}{64}\right) x_{TR}\left(\frac{nT}{64}\right)^* = 0.$$

In short, the TR-L-LTF has (substantially) the same time and frequency domain properties as the L-LTF.

Using L-LTF 212 as in packet format (a) of FIG. 2 (implicitly) indicates that transmission of the data packet utilizes 20 MHz (the first frequency bandwidth) 211. Using TR-L-LTF 222 as in packet formats (b) and (c) of FIG. 2 (implicitly) indicates that transmission of the data packet utilizes frequency bandwidth 221, 231 which is larger than 20 MHz. In this particular example, using TR-L-LTF 222 as in packet formats (b) and (c) also indicates that SIG 223, 233 can be read over 40 MHz and that SIG indicates which frequency bandwidth is used for the data field 224, 234.

By using L-LTF/TR-L-LTF as frequency bandwidth detection field, the information regarding the frequency bandwidth utilized for the data packet is very efficiently conveyed since no extra overhead is used for that information.

L-STF may be seen as an example of a synchronization field comprising a repetitive time domain pattern.

SIG may be seen as an example of a control field utilizing the first frequency bandwidth (e.g., 20 MHz) when the frequency bandwidth detection field has the first field content (e.g., L-LTF) and utilizing a second frequency bandwidth (e.g., 40 MHz) when the frequency bandwidth detection field has the second field content (e.g., TR-L-LTF), the control field being indicative of which of several second frequency bandwidths (e.g., 40, 80, or 160 MHz) is utilized for transmission of the data packet when the frequency bandwidth detection field has the second field content.

FIG. 4 schematically illustrates other example packet formats of a PPDU for IEEE802.11 according to some embodiments. The examples of FIG. 4(b)-(c) may be seen as alternatives to the example packet format version illustrated in FIG. 2(c) and FIG. 4(a), i.e., for 80 MHz. Corresponding alternatives apply for the example packet format versions illustrated in FIG. 2(a)-(b). In some embodiments, it is possible to dynamically change between different packet formats (e.g., those of FIG. 4(a)-(c)) between transmissions of different data packets.

In FIG. 4, the PPDU format consists of a preamble (comprising L-STF 401 of 8 µs duration 491, TR-L-LTF 432 of 8 µs duration 492, and SIG 433 of 4 µs duration 493) and a data field 434. L-STF and TR-L-LTF extend over 20 MHz and are each transmitted in four instances, SIG extend over 40 MHz and is transmitted in two instances and the data field extend over 80 MHz as illustrated by 431.

The preamble of the PPDU format in FIG. 4(b) also has a HE-LTF 435 of variable duration, and the preamble of the PPDU format in FIG. 4(c) also has HE-STF 436 of 4 µs duration and HE-LTF 435 of variable duration. These approaches enable use of the IEEE802.11ax numerology. Use of IEEE802.11ax numerology, i.e., use of one of the formats of FIG. 4 (b)-(c), may be indicated in SIG 433.

Figure 5:
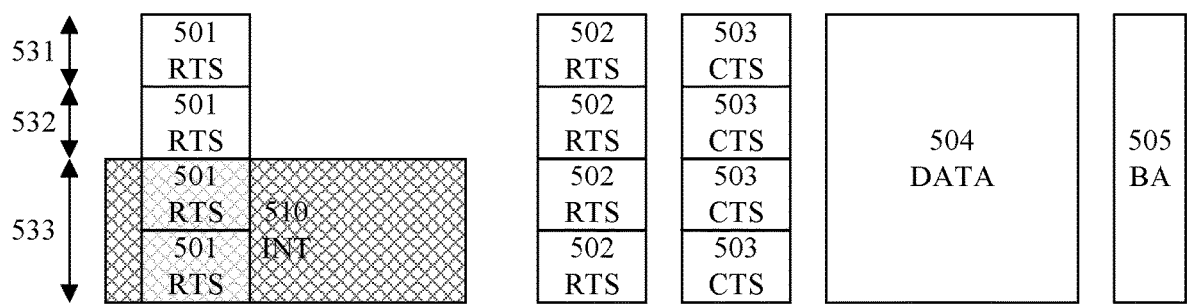
FIG. 5 is a signaling diagram illustrating example signaling according to some embodiments.

FIG. 5 schematically illustrates example signaling according to some embodiments, for a data transfer session aiming for 80 MHz frequency bandwidth (consisting of a 20 MHz primary bandwidth 531, a 20 MHz secondary bandwidth 532, and a 40 MHz secondary bandwidth 533). The example of FIG. 5 is applicable when devices (STA) do not support adaptive channel bandwidth, while being aware of the lean packet format according to FIGS. 2-3.

In FIG. 5, a first device (STA1) sends four copies of a 20 MHz Ready To Send (RTS) message 501 over the 80 MHz bandwidth using IEEE802.11a PHY. Since the 40 MHz secondary bandwidth 533 experiences interference (INT) as illustrated by 510, a second device (STA2) cannot respond to the RTS 501 by sending a Clear To Send (CTS) message.

To be able to transmit, STA1 sends four copies of another 20 MHz Ready To Send (RTS) message 502 over the 80 MHz bandwidth using IEEE802.11a PHY. Since no interference is experienced then, STA2 responds by sending four copies of a 20 MHz Clear To Send (CTS) message 503 over the 80 MHz bandwidth using IEEE802.11a PHY. The RTS 502 and/or the CTS 503 may cause other nodes (e.g., any hidden node) operating in accordance with IEEE802.11ax to defer transmission.

Then, STA1 may transmit data 504 over the 80 MHz bandwidth using IEEE802.11be PHY, and STA2 may respond by sending a 80 MHz Block Acknowledgement (BA) message 505 using the lean PHY as described above (e.g., in connection to FIGS. 2-3).

In the scenario of FIG. 5, the PPDUs that require repetition (RTS/CTS; 501, 502, 503) are transmitted using a 20 MHz version (FIG. 2(a)) of the proposed lean PHY that is compatible with IEEE802.11a, while the BA 505 is transmitted using a lean PHY PPDU with 80 MHz bandwidth (FIG. 2(c)). Since a legacy format is used for RTS/CTS, any hidden IEEE802.11ax nodes hearing either RTS or CTS will defer from transmission as noted above. The data 504 is sent using the extremely high throughput (EHT) IEEE802.11be PHY. Using the lean PHY to transmit the BA increases efficiency compared to IEEE802.11a PHY since there is no need to duplicate the BA information. Thus, the BA 505 consumes roughly one fourth of the radio resources consumed by a BA sent according to IEEE802.11a PHY for this scenario).

Figure 6:
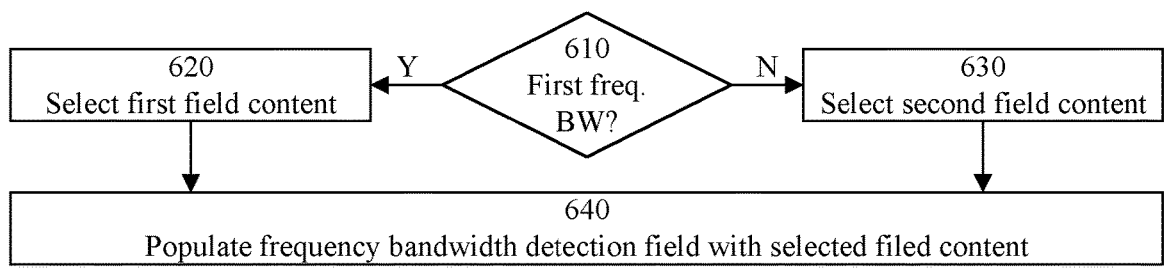
FIG. 6 is a flowchart illustrating example method steps according to some embodiments.

FIG. 6 illustrates an example method for transmission of data packets over a communication channel, wherein transmission of one of the data packets utilizes a frequency bandwidth, and wherein the frequency bandwidth is dynamically variable between data packets.

The data packets have a packet format as exemplified above (e.g., in connection to FIG. 1 and/or FIGS. 2-3).

The method starts in step 610, where it is determined which bandwidth should be used for transmission of a data packet.

When the first frequency bandwidth (e.g., 20 MHz) is to be used (Y-path out of step 610), a first field content (e.g., L-LTF) is selected in step 620.

When the frequency bandwidth larger than the first frequency bandwidth (e.g., 40, 80, or 160 MHz) is to be used (N-path out of step 610), a second field content (e.g., TR-L-LTF) is selected in step 630.

In step 640, a frequency bandwidth detection field of the packet format is populated with the selected (first or second) field content.

As mentioned before, corresponding parts of the first and second field contents are orthogonal to each other. This may be achieved by time reversal of the OFDM symbol of the L-LTF as illustrated by FIG. 3.

As is well known, the OFDM symbol of the L-LTF may be generated by feeding an inverse fast Fourier transform (IFFT) with OFDM symbol samples. In practice, the time reversed version of the OFDM symbol for the TR-L-LTF may be generated by feeding the IFFT with the same OFDM symbol samples; but in reversed tap order.

Figure 7:
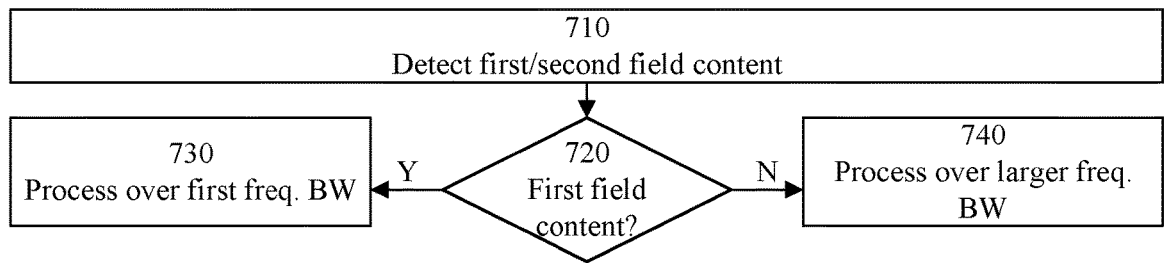
FIG. 7 is a flowchart illustrating example method steps according to some embodiments.

FIG. 7 illustrates an example method for reception of data packets over a communication channel, wherein transmission of one of the data packets utilizes a frequency bandwidth, and wherein the frequency bandwidth is dynamically variable between data packets.

The data packets may have a packet format as exemplified above (e.g., in connection to FIG. 1 and/or FIGS. 2-3).

The method starts in step 710, where it is detected whether the frequency bandwidth detection field of the packet format has a first field content (e.g., L-LTF) or a second field content (e.g., TR-L-LTF). As mentioned before, corresponding parts of the first and second field contents are orthogonal to each other, which facilitates detection.

When the first field content is detected (Y-path out of step 720), the data packet is processed as received over a first frequency bandwidth (e.g., 20 MHz) in step 730.

When the second field content is detected (N-path out of step 720), the data packet is processed as received over a frequency bandwidth which is larger than the first frequency bandwidth (e.g., 40, 80, or 160 MHz) in step 740.

Figure 8:
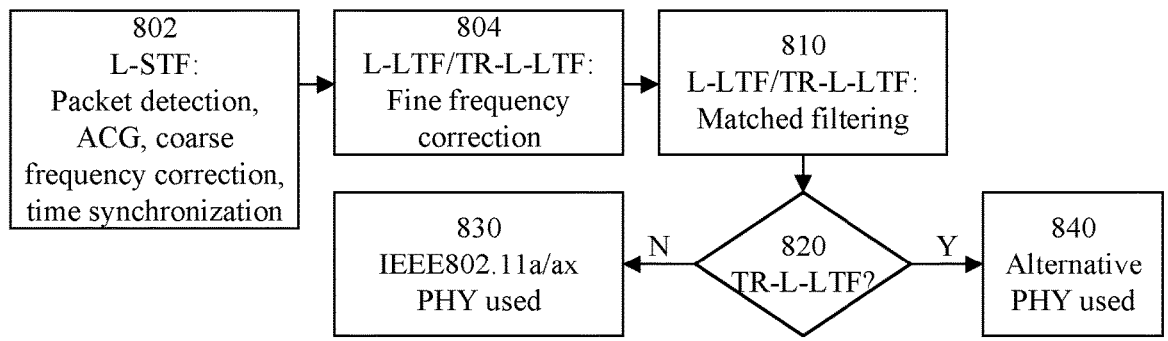
FIG. 8 is a flowchart illustrating example method steps according to some embodiments.

FIG. 8 illustrates an example method for reception of data packets over a communication channel, wherein transmission of one of the data packets utilizes a frequency bandwidth, and wherein the frequency bandwidth is dynamically variable between data packets.

The data packets may have a packet format as exemplified above (e.g., in connection to FIG. 1 and/or FIGS. 2-3).

The method starts in step 802, where packet detection, automatic gain control (AGC), course frequency correction, and time synchronization is performed using L-STF; e.g., in accordance with well-known methods.

In step 804, L-LTF/TR-L-LTF is used for fine frequency correction. L-LTF and TR-L-LTF work equally well for this purpose.

In step 810, it is detected whether the frequency bandwidth detection field of the packet format is L-LTF or TR-L-LTF (compare with step 710 of FIG. 7). As mentioned before, corresponding parts of the first and second field contents are orthogonal to each other, which facilitates detection. Detection may, for example, be achieved via matched filtering.

In some implementations, the frequency bandwidth detection field is independently passed through two different filters—one matched to L-LTF and one matched to TR-L-LTF—and when one of the two correlation values exceeds a detection threshold, the corresponding content (first or second field content) is considered detected. Due to the orthogonality, the other correlation value should be zero (or very close thereto).

When L-LTF is detected (N-path out of step 820), it is determined that the data packet uses IEEE802.11a/ax PHY as illustrated by step 830 (compare with step 730 of FIG. 7).

When TR-L-LTF is detected (Y-path out of step 820), it is determined that the data packet uses an alternative PHY as illustrated by step 840 (compare with step 740 of FIG. 7), e.g., the lean PHY as described herein.

It should be noted that various parts of the approaches of FIGS. 7 and 8 may be combined, as suitable.

Figure 9:
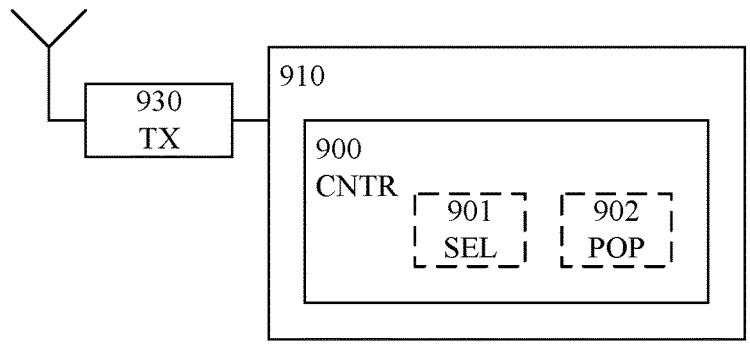
FIG. 9 is a schematic block diagram illustrating an example arrangement according to some embodiments.

FIG. 9 schematically illustrates an example arrangement comprising an apparatus 910 for transmission of data packets over a communication channel, wherein transmission of one of the data packets utilizes a frequency bandwidth, and wherein the frequency bandwidth is dynamically variable between data packets.

The data packets have a packet format as exemplified above (e.g., in connection to FIG. 1 and/or FIGS. 2-3).

The apparatus 910 may be comprised in a transmitter device, e.g., a wireless communication device such as an access point (AP) or a station (STA). The apparatus may, for example, be configured to cause execution of (e.g., execute) any of the method steps as described in connection to FIG. 6.

The apparatus comprises a controller (CNTR; e.g., controlling circuitry, or a control module) 900.

The controller is configured to cause population of a frequency bandwidth detection field of the packet format with a first field content or a second field content, wherein corresponding parts of the first and second field contents are orthogonal to each other, and wherein the first field content is for indicating transmission of the data packet utilizing a first frequency bandwidth and the second field content is for indicating transmission of the data packet utilizing a frequency bandwidth which is larger than the first frequency bandwidth.

To this end, the controller may comprise, or be otherwise associated with (e.g., connectable, or connected, to) a selector (SEL; e.g., selection circuitry or a selection module) 901 and a populator (POP; e.g., population circuitry or a population module) 902.

The selector may be configured to selection a first field content (e.g., L-LTF) when the first frequency bandwidth is to be used and a second field content (e.g., TR-L-LTF) when a frequency bandwidth larger than the first frequency bandwidth is to be used, and the populator may be configured to populate the frequency bandwidth detection field of the packet format accordingly.

The controller may also be configured to cause transmission of the data packet, by a transmitter (TX; e.g., transmission circuitry or a transmission module) 930 connectable, or connected, to the apparatus 910.

Figure 10:
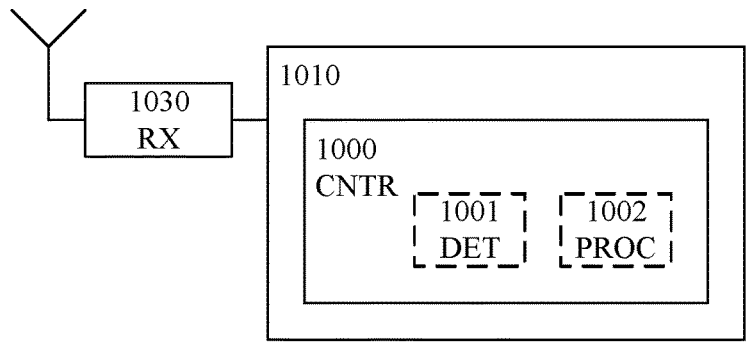
FIG. 10 is a schematic block diagram illustrating an example arrangement according to some embodiments.

FIG. 10 schematically illustrates an example arrangement comprising an apparatus 1010 for reception of data packets over a communication channel, wherein transmission of one of the data packets utilizes a frequency bandwidth, and wherein the frequency bandwidth is dynamically variable between data packets.

The data packets have a packet format as exemplified above (e.g., in connection to FIG. 1 and/or FIGS. 2-3).

The apparatus 1010 may be comprised in a receiver device, e.g., a wireless communication device such as an access point (AP) or a station (STA). The apparatus may, for example, be configured to cause execution of (e.g., execute) any of the method steps as described in connection to FIGS. 7-8.

The apparatus comprises a controller (CNTR; e.g., controlling circuitry, or a control module) 1000.

The controller is configured to cause detection of whether a frequency bandwidth detection field of the packet format has a first field content or a second field content, wherein corresponding parts of the first and second field contents are orthogonal to each other.

To this end, the controller may comprise, or be otherwise associated with (e.g., connectable, or connected, to) a detector (DET; e.g., detection circuitry or a detection module) 1001; for example correlator(s) or matched filter(s). The detector may be configured to detect whether a frequency bandwidth detection field of the packet format has a first field content (e.g., L-LTF) or a second field content (e.g., TR-L-LTF).

The controller is configured to cause processing of the data packet as received over a first frequency bandwidth when the first field content is detected, and processing of the data packet as received over frequency bandwidth which is larger than the first frequency bandwidth when the second field content is detected.

To this end, the controller may comprise, or be otherwise associated with (e.g., connectable, or connected, to) a processor (PROC; e.g., processing circuitry or a processing module) 1002.

The processor may be configured to process the data packet as received over a first frequency bandwidth (e.g., 20 MHz) when the first field content is detected and as received over frequency bandwidth (e.g., 40, 80, or 160 MHz) which is larger than the first frequency bandwidth when the second field content is detected.

The controller may also be configured to cause reception of the data packet, by a receiver (RX; e.g., reception circuitry or a reception module) 1030 connectable, or connected, to the apparatus 1010.

Generally, it may be noted that use of IEEE802.11ac/ax numerologies and channel codes may bring significant performance and resource utilization gains. For example, the relative radio resource utilization in percentage of the allocated time×bandwidth for various numerologies is as follows, where $N_{SD}$ denotes the number of data subcarriers per frequency segment, 64 is the total number of subcarriers, $\Delta f$ denotes subcarrier separation, and an OFDM symbol is 3.2 μs (4 μs with CP) for IEEE802.11a/ac and 12.8 μs (13.6 μs with CP) for IEEE802.11ax:

IEEE802.11 numerology (20 MHz), $N_{SD} = 48$, $$\text{Data symbols: } \frac{32 \ \mu s \times (\Delta f \times N_{SD})}{4 \ \mu s \times (\Delta f \times 64)} = \frac{3}{5} = 60\%$$

IEEE802.11ac numerology (20 MHz), $N_{SD} = 52$, $$\text{Data symbols: } \frac{3.2 \ \mu s \times (\Delta f \times N_{SD})}{4 \ \mu s \times (\Delta f \times 64)} = \frac{13}{20} = 65\%$$

IEEE802.11ax numerology (20 MHz), $N_{SD} = 234$, $$\text{Data symbols: } \frac{12.8 \ \mu s \times (\Delta f \times N_{SD})}{13.6 \ \mu s \times (\Delta f \times 256)} = \frac{117}{136} = 86\%$$

Thus, beacons could use the IEEE802.11ax PPDU format, acknowledgements could use the IEEE802.11a PPDU format, and block acknowledgements could use the lean 6 GHz PPDU format. Such an approach would improve the radio resource utilization in IEEE802.11be networks, while remaining backwards compatible with IEEE802.11ax STAs.

According to some embodiments a PPDU format is introduced that has a preamble as short as IEEE802.11a PPDUs. At the same time the introduced PPDU format supports frequency bandwidths larger than 20 MHz, enables packet detection for different PHYs (e.g., IEEE802.11ax/be), and allows re-use of the packet detection and synchronization algorithms used in IEEE802.11ax STAs. The introduced PPDU format has lower overhead than the one suggested for LT PHY. Furthermore, the introduced PPDU format is compatible with IEEE802.11ax STAs operating in 6 GHz; unlike the LT PHY.

According to some embodiments the introduced PPDU format consists of a preamble followed by a data part, wherein the preamble consists of three parts: a first part (e.g., L-STF) consisting of repetitive time domain patterns, a second part consisting of a duplicated OFDM symbol (e.g., an L-LTF OFDM symbol) prepended by a cyclic prefix or of a time reversed version of the duplicated OFDM symbol prepended by a cyclic prefix, and a third part comprising a signaling field (e.g., SIG; which may indicate the numerology used for the data part) having a bandwidth which depends on whether or not the time reversed version is used for the second part.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 11:
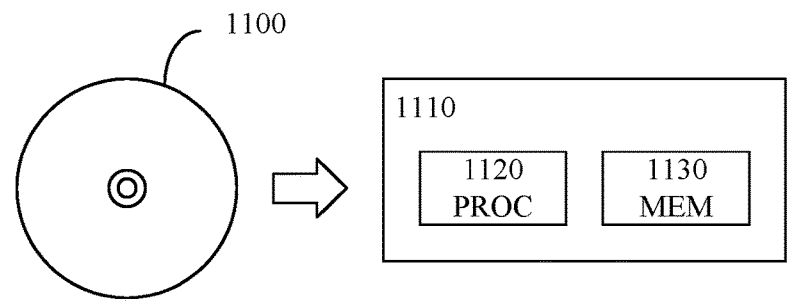
FIG. 11 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 11 illustrates an example computer readable medium in the form of a compact disc (CD) ROM 1100. The computer readable medium has stored thereon a computer program comprising program instructions. The computer program is loadable into a data processor (PROC; e.g., data processing circuitry or a data processing unit) 1120, which may, for example, be comprised in a wireless communication device or a network node 1110. When loaded into the data processor, the computer program may be stored in a memory (MEM) 1130 associated with or comprised in the data-processing unit. According to some embodiments, the computer program may, when loaded into and run by the data processing unit, cause execution of method steps according to, for example, any of the methods illustrated in FIGS. 6-8 or otherwise described herein.

Figure 12:
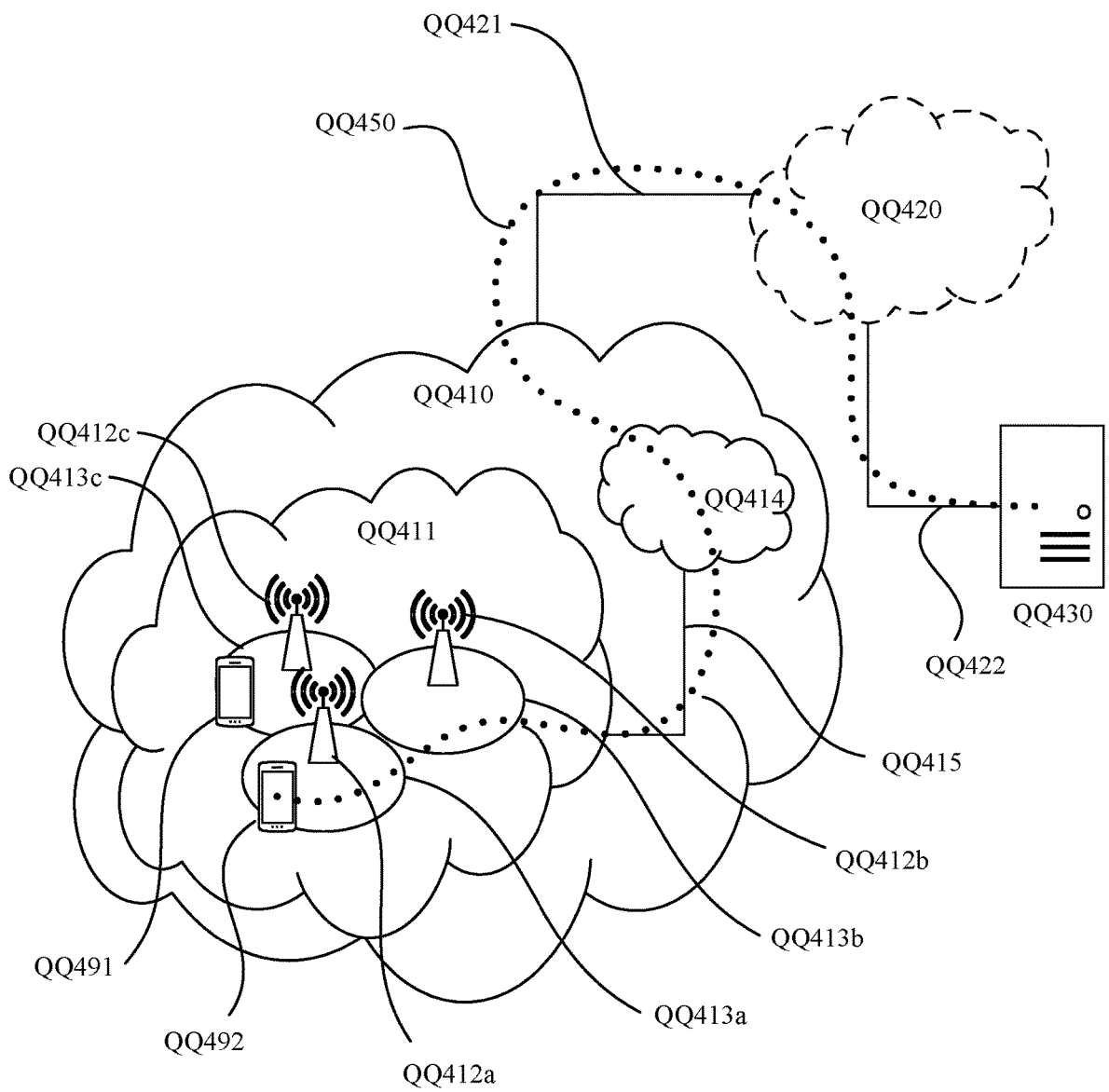
FIG. 12 illustrates a telecommunication network connected via an intermediate network to a host computer in accordance with some embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 13:
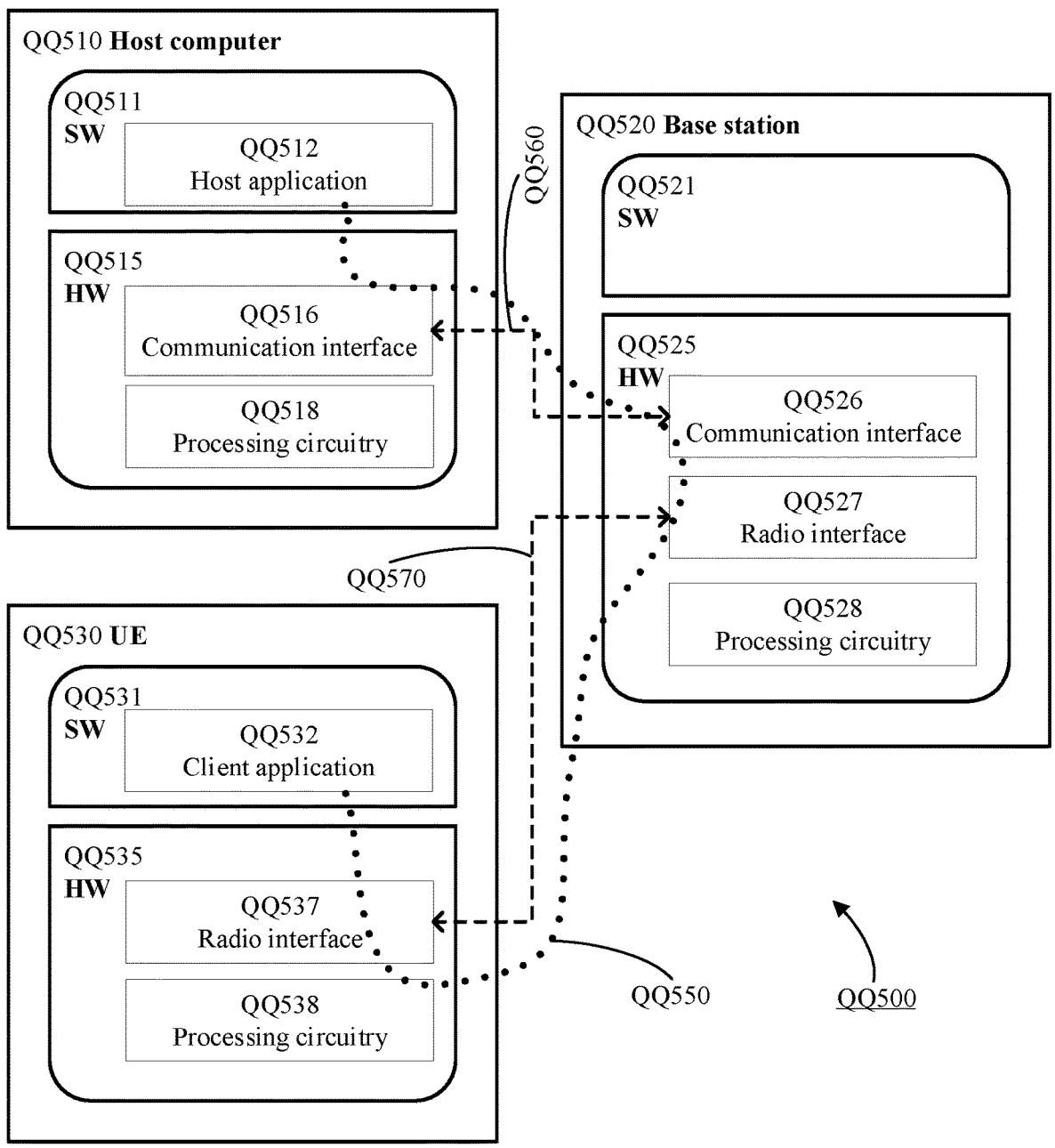
FIG. 13 illustrates a host computer communicating via a base station with a user equipment over a partially wireless connection in accordance with some embodiments.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the flexibility of data packets and thereby provide benefits such as reduced signaling overhead and increased throughput.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
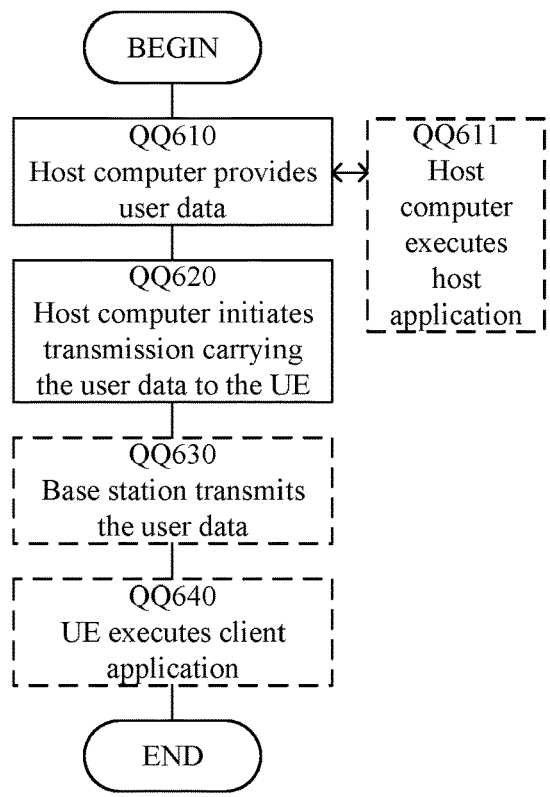
FIG. 14 is a flowchart illustrating example method steps implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
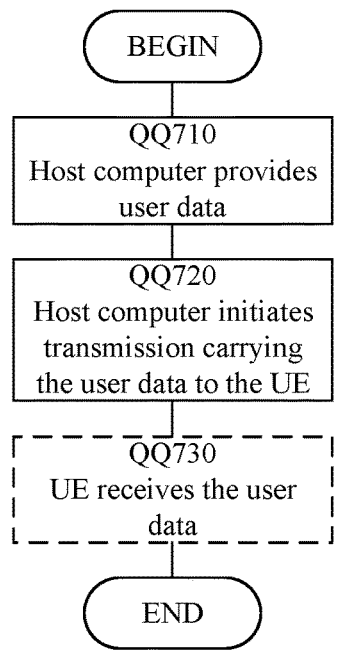
FIG. 15 is a flowchart illustrating example method steps implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
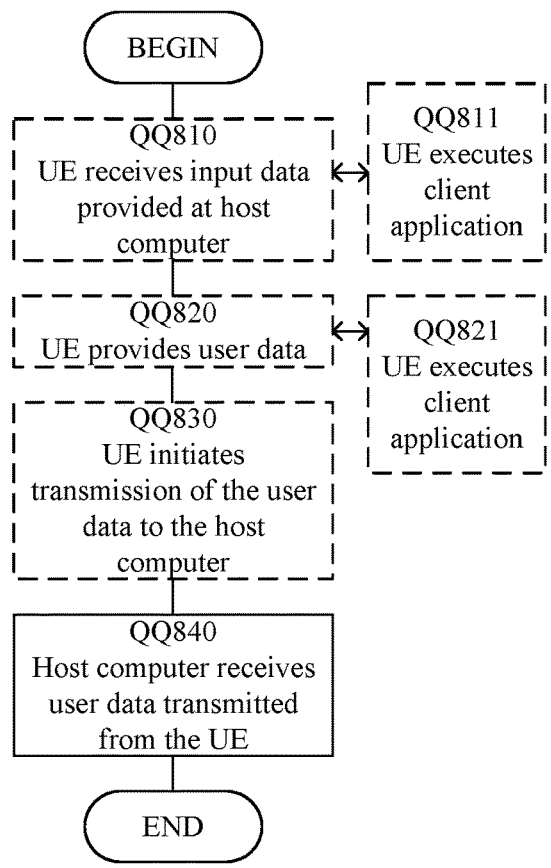
FIG. 16 is a flowchart illustrating example method steps implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
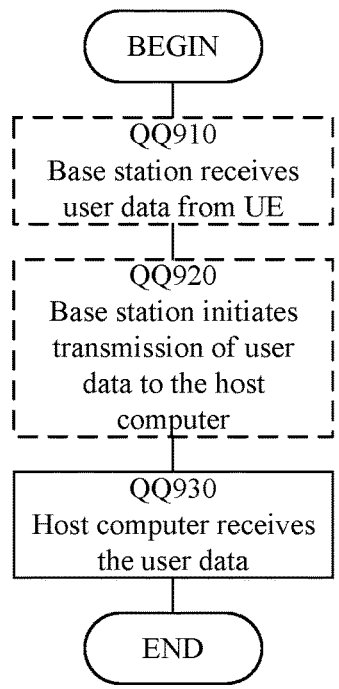
FIG. 17 is a flowchart illustrating example method steps implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for transmission of data packets over a communication channel, wherein the data packets have a packet format, wherein transmission of one of the data packets utilizes a frequency bandwidth, and wherein the frequency bandwidth is dynamically variable between data packets, the method comprising:
  populating a frequency bandwidth detection field of the packet format with a first field content or a second field content, wherein corresponding parts of the first and second field contents are orthogonal to each other, and wherein the first field content is selected when transmission of the data packet utilizes a first frequency bandwidth and the second field content is selected when transmission of the data packet utilizes a frequency bandwidth which is larger than the first frequency bandwidth.

A2. A method performed by a wireless device for reception of data packets over a communication channel, wherein the data packets have a packet format, wherein transmission of one of the data packets utilizes a frequency bandwidth, and wherein the frequency bandwidth is dynamically variable between data packets, the method comprising:
  detecting whether a frequency bandwidth detection field of the packet format has a first field content or a second field content, wherein corresponding parts of the first and second field contents are orthogonal to each other;
  processing the data packet as received over a first frequency bandwidth when the first field content is detected; and
  processing the data packet as received over frequency bandwidth which is larger than the first frequency bandwidth when the second field content is detected.

A3. The method of any of the previous embodiments in Group A, further comprising:
  providing user data; and
  forwarding the user data to a host computer via the transmission to the base station.

Group B Embodiments

B1. A method performed by a base station for transmission of data packets over a communication channel, wherein the data packets have a packet format, wherein transmission of one of the data packets utilizes a frequency bandwidth, and wherein the frequency bandwidth is dynamically variable between data packets, the method comprising:
  populating a frequency bandwidth detection field of the packet format with a first field content or a second field content, wherein corresponding parts of the first and second field contents are orthogonal to each other, and wherein the first field content is selected when transmission of the data packet utilizes a first frequency bandwidth and the second field content is selected when transmission of the data packet utilizes a frequency bandwidth which is larger than the first frequency bandwidth.

B2. A method performed by a base station for reception of data packets over a communication channel, wherein the data packets have a packet format, wherein transmission of one of the data packets utilizes a frequency bandwidth, and wherein the frequency bandwidth is dynamically variable between data packets, the method comprising:
  detecting whether a frequency bandwidth detection field of the packet format has a first field content or a second field content, wherein corresponding parts of the first and second field contents are orthogonal to each other;
  processing the data packet as received over a first frequency bandwidth when the first field content is detected; and
  processing the data packet as received over frequency bandwidth which is larger than the first frequency bandwidth when the second field content is detected.

B3. The method of any of the previous embodiments in Group B, further comprising:
  obtaining user data; and
  forwarding the user data to a host computer or a wireless device.

Group C Embodiments

C1. A wireless device for transmission and/or reception of data packets over a communication channel, the wireless device comprising:
  processing circuitry configured to perform any of the steps of any of the Group A embodiments; and
  power supply circuitry configured to supply power to the wireless device.

C2. A base station for transmission and/or reception of data packets over a communication channel, the base station comprising:
  processing circuitry configured to perform any of the steps of any of the Group B embodiments;
  power supply circuitry configured to supply power to the base station.

C3. A user equipment (UE) for transmission and/or reception of data packets over a communication channel, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
  the processing circuitry of the host computer is configured to execute a host application; and
  the UE's processing circuitry is configured to execute a client application associated with the host application, thereby providing the user data.

D18. The communication system of any of embodiments D14 through D17, wherein:
  the processing circuitry of the host computer is configured to execute a host application, thereby providing request data; and
  the UE's processing circuitry is configured to execute a client application associated with the host application, thereby providing the user data in response to the request data.

D19. A method implemented in a communication system including a host computer, a base station and a user equipment (UE), the method comprising:
  at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
  at the UE, executing a client application, thereby providing the user data to be transmitted; and
  at the host computer, executing a host application associated with the client application.

D22. The method of any of embodiments D19 through D21, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
  the processing circuitry of the host computer is configured to execute a host application;
  the UE is configured to execute a client application associated with the host application, thereby providing the user data to be received by the host computer.

D28. A method implemented in a communication system including a host computer, a base station and a user equipment (UE), the method comprising:
  at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
  at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for configuring a packet format for transmission of data packets over a communication channel, transmission of one of the data packets utilizing a frequency bandwidth, the frequency bandwidth being dynamically variable between the data packets, the method comprising:
  configuring the packet format to include:
    a frequency bandwidth detection field, the frequency bandwidth detection field of a data packet having one of a first field content and a second field content, corresponding parts of the one of the first and the second field contents being orthogonal to each other; and
    the first field content being indicative of transmission of the data packet that utilizes a first frequency bandwidth and the second field content being indicative of transmission of the data packet utilizes a second frequency bandwidth which is larger than the first frequency bandwidth; and the first field content including at least one instance of a first orthogonal frequency division multiplex (OFDM) symbol, and the second field content including at least one instance of a second OFDM symbol, the first OFDM symbol being obtained as $x(t)=\Sigma_{k=-26}^{26} \text{LTF}_k e^{j2\pi kt/T}$, $0 \le t \le T=3.2$ μs, the second OFDM symbol being, obtained as $x_{TR}(t)=\Sigma_{k=-26}^{26} \text{LTF}_k e^{j2\pi k(T-t)/T}$, $0 \le t \le T=3.2$ μs, where $\text{LTF}_k$ denotes a long training field, $x_{TR}(t)$ denotes time reversed OFDM symbol and T denotes a duration of the first and the second OFDM symbols.

2. The method of claim 1, wherein the second OFDM symbol is a time reversed version of the first OFDM symbol.

3. The method of claim 2, wherein the first field content consists of two instances of the first OFDM symbol and a first cyclic prefix, CP, wherein the first CP is a copy of a portion of the first OFDM symbol, and the second field content consists of two instances of the second OFDM symbol and a second CP, wherein the second CP is a copy of a portion of the second OFDM symbol.

4. The method of claim 2, wherein corresponding parts are defined as instances of the first and the second OFDM symbols.

5. The method of claim 1, wherein the frequency bandwidth is dynamically variable between at least two predetermined frequency bandwidths: the first frequency bandwidth and the second frequency bandwidth.

6. The method of claim 1, further defining one or more of:
a synchronization field comprising a repetitive time domain pattern;
a control field utilizing the first frequency bandwidth when the frequency bandwidth detection field has the first field content and utilizing the second frequency bandwidth when the frequency bandwidth detection field has the second field content; and
a data field suitable for transmission over the frequency bandwidth indicated by the frequency bandwidth detection field.

7. The method of claim 6, wherein the control field is indicative of which of the one or more second frequency bandwidths is utilized for transmission of the data packet.

8. The method of claim 6, wherein at least one of:
the synchronization field is a legacy short training field, L-STF; and
the control field is a signaling field, SIG.

9. The method of claim 1, wherein at least one of:
the data packet is a physical layer convergence protocol data unit, PPDU; and
the frequency bandwidth detection field is a legacy long training field, L-LTF.

10. The method of claim 1, wherein the packet format is for use in compliance with at least one of IEEE802.11ax and IEEE802.11be.

11. The method of claim 1, wherein the second field content is a time reversed version of the first field content.

12. The method of claim 1, wherein the second field content consists of two or more parts, wherein at least one part is a time reversed version of the corresponding part of the first field content.

13. The method of claim 1, wherein the first frequency bandwidth detection field is a long training field, L-LTF.

14. A method for transmission of data packets over a communication channel, the data packets having a packet format, transmission of one of the data packets utilizing a frequency bandwidth, the frequency bandwidth being dynamically variable between the data packets, the method comprising:
populating a frequency bandwidth detection field of the packet format with one of a first field content and a second field content, corresponding parts of the first and the second field contents being orthogonal to each other, and the first field content being selected when transmission of the data packet utilizes a first frequency bandwidth and the second field content being selected when transmission of the data packet utilizes a frequency bandwidth which is larger than the first frequency bandwidth; and
the first field content including at least one instance of a first orthogonal frequency division multiplex (OFDM) symbol, and the second field content including at least one instance of a second OFDM symbol, the first OFDM symbol being obtained as $x(t)=\Sigma_{k=-26}^{26} \text{LTF}_k e^{j2\pi kt/T}$, $0 \le t \le T=3.2$ μs, the second OFDM symbol being obtained as $x_{TR}(t)=\Sigma_{k=-26}^{26} \text{LTF}_k e^{j2\pi k(T-t)/T}$, $0 \le t \le T=3.2$ μs, where $\text{LTF}_k$ denotes a long training field, $x_{TR}(t)$ denotes time reversed OFDM symbol and T denotes a duration of the first and the second OFDM symbols.

15. The method of claim 14, wherein the second OFDM symbol is a time reversed version of the first OFDM symbol.

16. The method of claim 14, wherein the second OFDM symbol is a time reversed version of the first OFDM symbol.

17. A method for reception of data packets over a communication channel, the data packets having a packet format, transmission of one of the data packets utilizing a frequency bandwidth, the frequency bandwidth being dynamically variable between the data packets, the method comprising:
detecting whether a frequency bandwidth detection field of the packet format has a first field content or a second field content, corresponding parts of the first and the second field contents being orthogonal to each other;
processing the data packet as received over a first frequency bandwidth when the first field content is detected;
processing the data packet as received over a second frequency bandwidth which is larger than the first frequency bandwidth when the second field content is detected; and
the first field content including at least one instance of a first orthogonal frequency division multiplex (OFDM) symbol, and the second field content including at least one instance of a second OFDM symbol, the first OFDM symbol being obtained as $x(t)=\Sigma_{k=-26}^{26} \text{LTF}_k e^{j2\pi kt/T}$, $0 \le t \le T=3.2$ μs, the second OFDM symbol being obtained as $x_{TR}(t)=\Sigma_{k=-26}^{26} \text{LTF}_k e^{j2\pi k(T-t)/T}$, $0 \le t \le T=3.2$ μs, where $\text{LTF}_k$ denotes a long training field, $x_{TR}(t)$ denotes time reversed OFDM symbol and T denotes a duration of the first and the second OFDM symbols.

18. An apparatus for transmission of data packets over a communication channel, the data packets having a packet format, transmission of one of the data packets utilizing a frequency bandwidth, the frequency bandwidth being dynamically variable between the data packets, the apparatus comprising controlling circuitry configured to cause:
population of a frequency bandwidth detection field of the packet format with one of a first field content and a second field content, corresponding parts of the first and the second field contents are orthogonal to each other, and the first field content being for indicating transmission of the data packet utilizing a first frequency bandwidth and the second field content being for indicating transmission of the data packet utilizing a second frequency bandwidth which is larger than the first frequency bandwidth; and the first field content including at least one instance of a first orthogonal frequency division multiplex (OFDM) symbol, and the second field content including at least one instance of a second OFDM symbol, the first OFDM symbol being obtained as $x(t)=\Sigma_{k=-26}^{26} LTF_k e^{j2\pi kt/T}$, $0 \le t \le T = 3.2$ µs, the second OFDM symbol being, obtained as $x_{TR}(t)=\Sigma_{k=-26}^{26} LTF_k e^{j2\pi k(T-t)/T}$, $0 \le t \le T = 3.2$ µs, where $LTF_k$ denotes a long training field, $x_{TR}(t)$ denotes time reversed OFDM symbol and T denotes a duration of the first and the second OFDM symbols.

19. The apparatus of claim 18, wherein the second OFDM symbol is a time reversed version of the first OFDM symbol.

20. The apparatus of claim 18, wherein the apparatus is comprised in a transmitter.

21. The apparatus of claim 20, wherein the second OFDM symbol is a time reversed version of the first OFDM symbol.

22. An apparatus for reception of data packets over a communication channel, wherein the data packets have a packet format, transmission of one of the data packets utilizing a frequency bandwidth, the frequency bandwidth being dynamically variable between the data packets, the apparatus comprising controlling circuitry configured to cause:

detection of whether a frequency bandwidth detection field of the packet format has a first field content or a second field content, corresponding parts of the first and the second field contents being orthogonal to each other;

processing of the data packet as received over a first frequency bandwidth when the first field content is detected;

processing of the data packet as received over a second frequency bandwidth which is larger than the first frequency bandwidth when the second field content is detected; and the first field content including at least one instance of a first orthogonal frequency division multiplex (OFDM) symbol, and the second field content including at least one instance of a second OFDM symbol, the first OFDM symbol being obtained as $(t)=\Sigma_{k=-26}^{26} LTF_k e^{j2\pi kt/T}$, $0 \le t \le T = 3.2$ µs, the second OFDM symbol being, obtained as $x_{TR}(t)=\Sigma_{k=-26}^{26} LTF_k e^{j2\pi k(T-t)/T}$, $0 \le t \le T = 3.2$ µs, where $LTF_k$ denotes a long training field, $x_{TR}(t)$ denotes time reversed OFDM symbol and T denotes a duration of the first and the second OFDM symbols.

23. The apparatus of claim 22, wherein the apparatus is comprised in a receiver.

24. The apparatus of claim 23, wherein the second OFDM symbol is a time reversed version of the first OFDM symbol.

* * * * *